(12) United States Patent
Beets et al.

(10) Patent No.: US 10,427,791 B2
(45) Date of Patent: Oct. 1, 2019

(54) MEAL/BEVERAGE TROLLEY CONVERTIBLE TO WASTE TROLLEY

(71) Applicant: Safran Cabin Netherlands N.V., Alkmaar (NL)

(72) Inventors: Peter Hendrik Beets, Middenbeemster (NL); Allard Niels van Son, Heiloo (NL); Lyla Maria Kok, Haarlem (NL)

(73) Assignee: Safran Cabin Netherlands N.V., Alkmaar (NL)

( * ) Notice: Subject to any disclaimer, the term of this patent is extended or adjusted under 35 U.S.C. 154(b) by 0 days.

(21) Appl. No.: 15/952,291

(22) Filed: Apr. 13, 2018

(65) Prior Publication Data

US 2018/0297706 A1     Oct. 18, 2018

Related U.S. Application Data

(60) Provisional application No. 62/485,424, filed on Apr. 14, 2017.

(51) Int. Cl.
| | |
|---|---|
| *B64D 11/00* | (2006.01) |
| *B62B 3/02* | (2006.01) |
| *B65F 1/14* | (2006.01) |
| *F25D 3/12* | (2006.01) |
| *B64D 11/04* | (2006.01) |

(52) U.S. Cl.
CPC ............ *B64D 11/0007* (2013.01); *B62B 3/02* (2013.01); *B64D 11/04* (2013.01); *B65F 1/1415* (2013.01); *B65F 1/1473* (2013.01); *F25D 3/125* (2013.01); *B62B 2202/20* (2013.01); *B62B 2202/67* (2013.01); *B62B 2204/04* (2013.01); *B62B 2206/006* (2013.01)

(58) Field of Classification Search
CPC . B64D 11/04; B64D 11/0007; B62B 2202/67; F25D 3/125
See application file for complete search history.

(56) References Cited

U.S. PATENT DOCUMENTS

| | | | |
|---|---|---|---|
| 2011/0278879 A1* | 11/2011 | Belanger | ................ B29C 70/86 296/187.01 |
| 2014/0021690 A1* | 1/2014 | Burd | ...................... B62B 3/003 280/47.35 |

FOREIGN PATENT DOCUMENTS

| | | |
|---|---|---|
| EP | 0869893 | 10/1998 |
| EP | 2676880 | 12/2013 |
| WO | 1997014598 | 4/1997 |
| WO | 2006048586 | 5/2006 |
| WO | 2012056086 | 5/2012 |

OTHER PUBLICATIONS

Europe Patent Application No. 18167199.1, Extended European Search Report dated Jun. 8, 2018.

* cited by examiner

*Primary Examiner* — Elizabeth J Martin
(74) *Attorney, Agent, or Firm* — Kilpatrick Townsend & Stockton LLP; Dean W. Russell; Kristin M. Crall

(57) ABSTRACT

Trolleys designed for use onboard passenger transportation vehicles. Particular trolleys of this type find particular use onboard aircraft. The trolleys are used for meal and drink service and may be converted for use during waste collection.

10 Claims, 19 Drawing Sheets

MEAL/BEVERAGE TROLLEY CONVERTIBLE TO WASTE TROLLEY

CROSS REFERENCE TO RELATED APPLICATIONS

This application claims the benefit of U.S. Provisional Application Ser. No. 62/485,424, filed Apr. 14, 2017, titled "Meal, Drinks, and Waste Trolley," the entire contents of which are hereby incorporated by reference.

FIELD OF THE DISCLOSURE

Embodiments of the present disclosure relate generally to trolleys designed for use onboard passenger transportation vehicles. Trolleys of this type find particular use onboard aircraft. The trolleys are used for meal and drink service and may be converted for use during waste collection.

BACKGROUND

Passenger transportation vehicles such as aircraft often provide beverage and meal service to passengers. Airline attendants often wheel trolleys through aircraft aisles in order to offer various selections. These trolleys are often referred to as meal/drink or meal/beverage trolleys. These types of trolleys are generally provided with an interior compartment designed to support and receive one or more trays or slidable bins. Trolleys may be provided as full size trolleys or half size trolleys. The trolleys may be cooled via dry ice contained within the trolley. For example, an upper compartment may provide a storage place for dry ice in the top of the trolley. The dry ice compartment has a stationary base that supports the dry ice block. The dry ice may be accessible via a flap or a pull out tray. In other examples, an envelope or hollow cubby area is provided in the upper portion of the trolley and a dry ice block is slid therein.

Other types of trolleys are cooled in the galley using an air chiller system, such as an air over system (which function similar to a refrigerator) or an air through system (which blows cold air into the trolley). Such air over and air through systems do not have dry-ice drawers, but a deep top area. Once beverage and meal service is concluded, the meal/drink trolleys are stowed in the galley, and waste service begins.

For waste collection, attendants may simply carry a plastic bag for collection of waste and other waste items. However, if meals were served on trays, then trays need to be collected as well. In order to facilitate waste collection as well as tray collection, a supported trash bag or trash bin may be positioned within the interior compartment. One example of such a bag is illustrated by FIG. 27, and is referred to as a flex-e-bag. In other examples, a foldable cardboard waste bin may be positioned within the interior compartment. An example of this embodiment is illustrated by FIG. 28. In both instances, the top of the trolley provides a closed worktop that is used to collect trays. Trash is collected into the interior bin. However, the passengers have full view of the waste bin. This can be undesirable from a sanitary standpoint. The interior of these trolleys may not always be aesthetically pleasing. This design also requires that the attendants continually bend to insert trash into the lower part of the interior compartment. This is not ergonomically desirable and can lead to musculoskeletal strain injuries due to repetitive bending and kneeling. Further, the cardboard waste bins can be expensive, leading to higher recurring costs for the airline operator. Another challenge with using these types of trolleys for waste collection is that trays stacked too high on the top of the trolley can pose a safety hazard. However, if trays are stacked in the top of the interior compartment (above the waste bin), they may interfere with the waste collection process.

In other examples, a specifically designed waste trolley may be used. Normally, a waste trolley has trash flaps in its top and may also have a trash flap in the door. These flaps can be opened in order to receive waste into the interior of the trolley compartment. A heavy waste bin or waste bag may be used inside the trolley. In this instance, two types of trolleys must be stored in the aircraft galley. The meal/drink trolley is used to serve food and drinks while the waste trolley sits empty and unused in the galley during beverage and meal service. It is only used during the second half of the process, for waste collection. This is undesirable from a logistical standpoint, as well as the time and cost that it is required to organize two different trolleys. The system also requires more room in the galley. This is space that could be used for other goals such as sales trolleys or more passenger seats. The additional trolleys also add to the weight of the aircraft. Accordingly, improvements are desirable. The improvements described herein are useable with any of the above-described types of trolleys (such as trolleys using a dry ice compartment, trolleys using an air over/air through system and having a deep top, full or half size trolleys) as well as with any other types of trolleys that would benefit from being convertible between service and waste collection trolleys.

BRIEF SUMMARY

Embodiments of the invention described herein thus provide systems and methods for providing trolleys that can be converted between a meal/beverage trolley and a waste collection trolley. In specific examples, there is provided a trolley configured to be convertible between meal/beverage service and waste collection service, the trolley comprising: at least one dry ice compartment defined by a top flap and a dry ice compartment base, a waste ring defined by an outer rim and the dry ice compartment base, the outer rim and the dry ice compartment base being hingedly cooperable such when the sliding waste ring is extended from the trolley and the dry ice compartment base is hinged away from the outer rim, an opening is defined by the outer rim configured to support a waste bag, wherein when the top flap is opened, a trash opening is defined in an upper portion of the trolley. The waste ring may be a sliding waste ring. The waste ring may be configured to maintain its securement within the trolley. The waste ring may have side notches for securement of the waste bag.

The trolley interior may have internal ledges for supporting meal trays or bins or both. The trolley may have first and second dry ice compartments in hinged cooperation with one another. The first dry ice compartment may be hinged open and rest along a top portion of the second dry ice compartment. In an alternate example, if first and second dry ice compartments are provided, they may have a with a central portion therebetween, such that a first top flap of the first dry ice compartment and a second top flap of the second dry ice compartment are independently openable, and when in an open configuration, the top flaps lie against the central portion. It is possible for at least one dry ice compartment to be removable from the trolley. It is also possible to provide one or more bins that may be positioned within an open space defined by a removed or hinged dry ice compartment.

In another example, there is provided a method for converting a meal/beverage trolley to a waste collection trolley, comprising: providing a trolley according to any of the examples described above, extending the sliding waste ring out from the trolley, hinging the dry ice compartment base away from the outer rim of the sliding waste ring, positioning a waste bag within the opening of the sliding waste ring, sliding the waste ring back into the trolley, and opening the top flap to define a trash opening at an upper portion of the trolley. One or more features of the above examples may be combined with other features of any other example.

DETAILED DESCRIPTION

Figure 1:
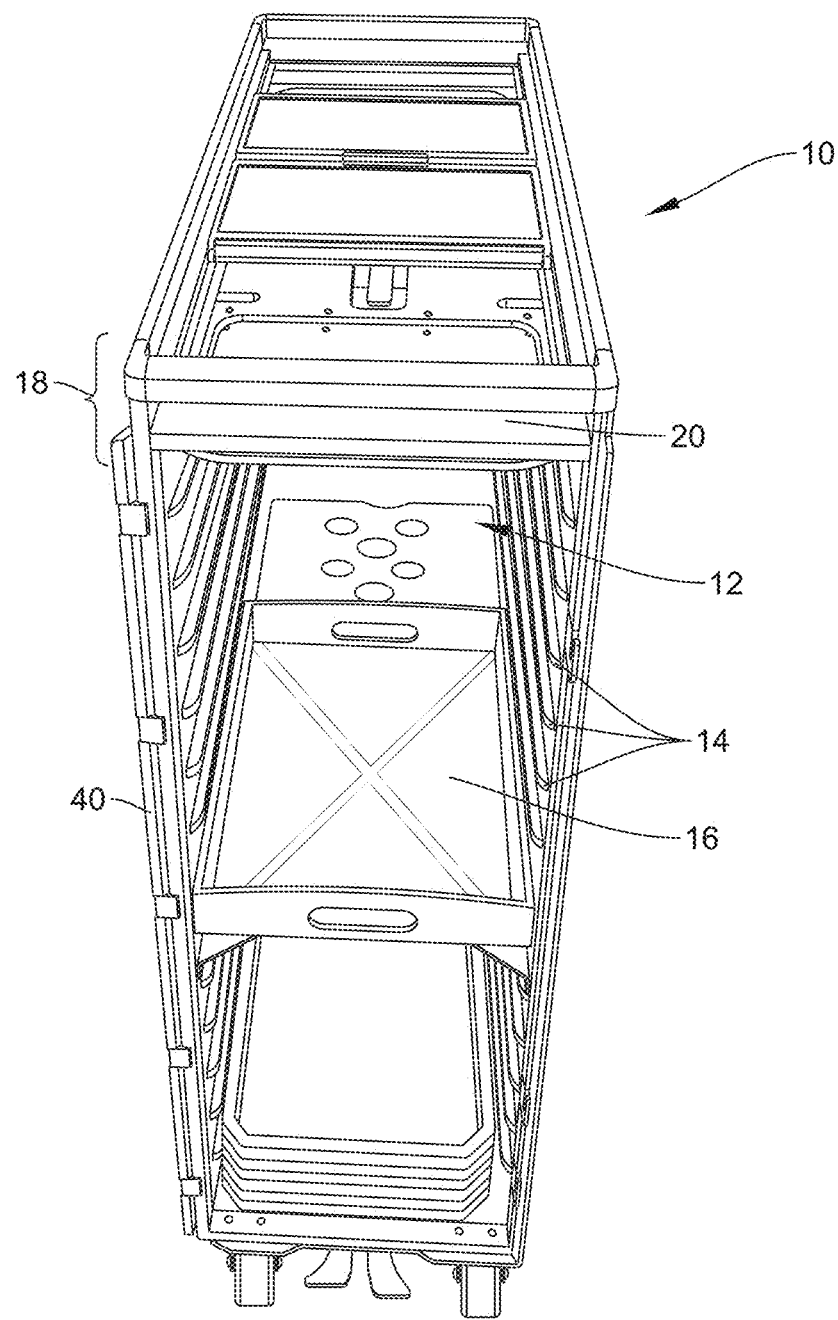
FIG. 1 shows a front perspective view of a trolley in the meal/beverage service configuration

Embodiments of the present invention provide a combination trolley 10 with features that allow the trolley to be converted between a meal/drink trolley and a waste trolley. In a particular example, the upper portion of a meal/drink trolley has features that can be changed from a dry ice compartment to a waste ring. More particularly, FIG. 1 illustrates the trolley 10 in its meal/drink configuration. In this figure, the trolley door 40 is shown as being swung open in order to reveal the trolley interior 12. In order to ease use as a meal or beverage trolley, there may be provided a series of internal ledges 14 that are configured to support one or more meal trays or bins 16. FIG. 1 illustrates a bin 16 positioned within the trolley interior 12, with bin edges resting on corresponding ledges 14. The upper portion 18 of this trolley version is provided with a dry ice compartment 20.

Figure 2:
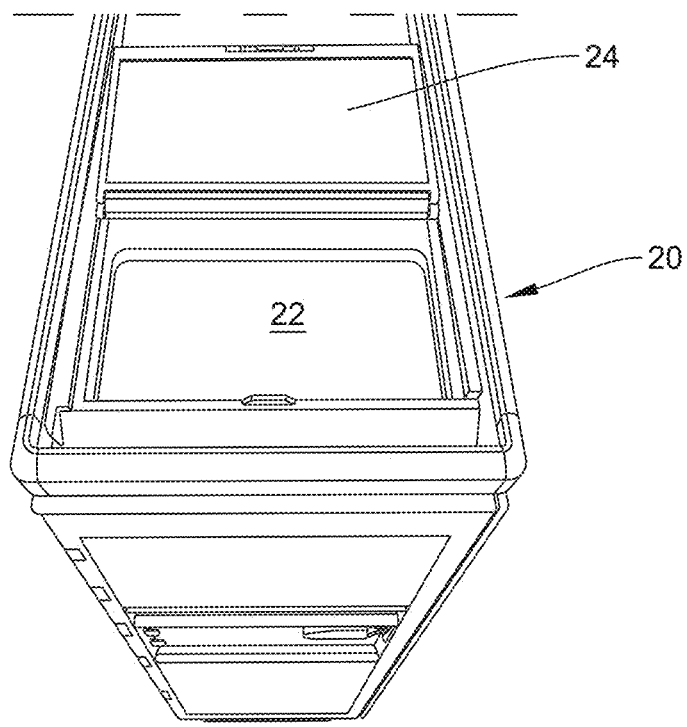
FIG. 2 shows a top perspective view of an alternate trolley, having a single top flap.
Figure 3:
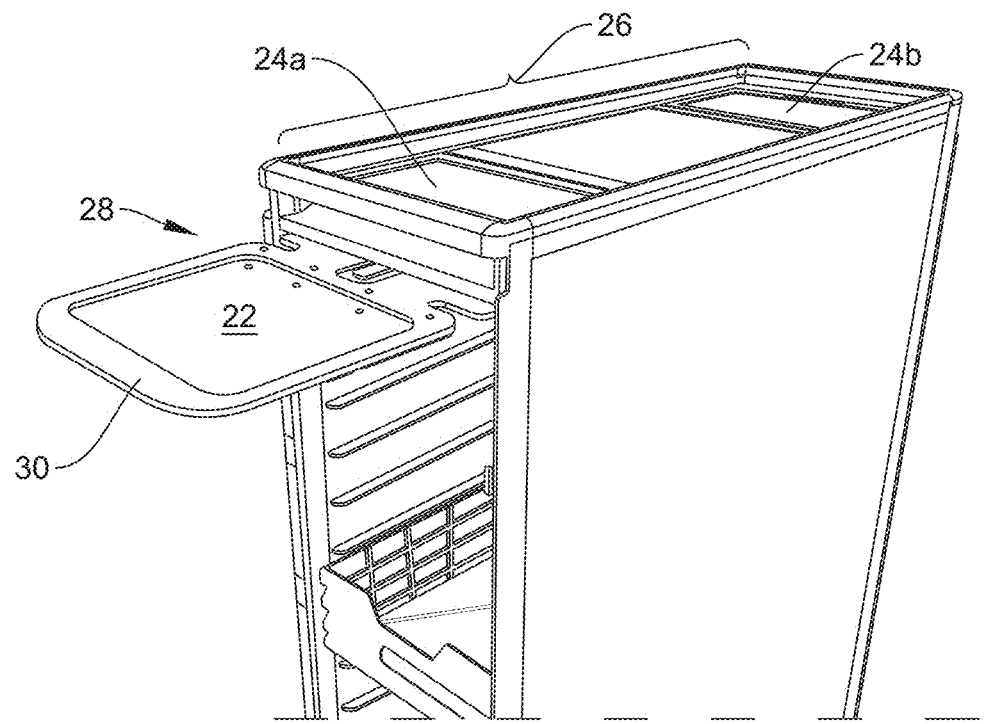
FIG. 3 a side perspective view of the trolley of FIG. 1 with the sliding waste ring in its extended position.

Referring to FIG. 2, the dry ice compartment 20 is defined at least in part by a base 22 and a top flap 24 (which is shown as opened in FIG. 2). The base 22 generally provides a lower support for a dry ice block that may be positioned within the dry ice compartment 20. The top flap 24 generally provides an upper enclosure for maintaining the dry ice compartment 20 in a closed configuration. When closed, the top flap 24 may also help define an upper working surface 26 of the trolley 10, as illustrated by FIG. 3. When opened, the top flap 24 allows removal and replacement of a dry ice block (not shown). In some embodiments, a single top flap 24 may be provided. This embodiment is illustrated by FIG. 2. In other embodiments, a double top flap (24a, 24b) may be provided as described further below, and as shown by FIGS. 3-8.

When the trolley is in this configuration, it is useful for meal and beverage service. For example, the trolley 10 maintains items contained within the trolley interior 12 in a chilled condition due to the dry ice compartment 20. When the top flap 24 is closed, the upper working surface 26 may be used to hold drink bottles, cups, coffee carafes, stirrers, napkins, silverware, and any other beverage or meal service items. The trolley interior 12 may house or otherwise support food trays for meal service or bins 16 configured to hold soda cans, juice cans, water bottles, or any other appropriate service items.

Once the meal/beverage service has been completed, the trolley 10 may be converted to a waste trolley. For use as a waste trolley, it is desirable for the trolley interior 12 to be able to contain a trash bag or other waste receptacle. It is also desirable for trash to be inserted into the top of the trolley, rather than requiring the airline attendant to bend down in order to insert trash into the trolley interior.

Figure 4:
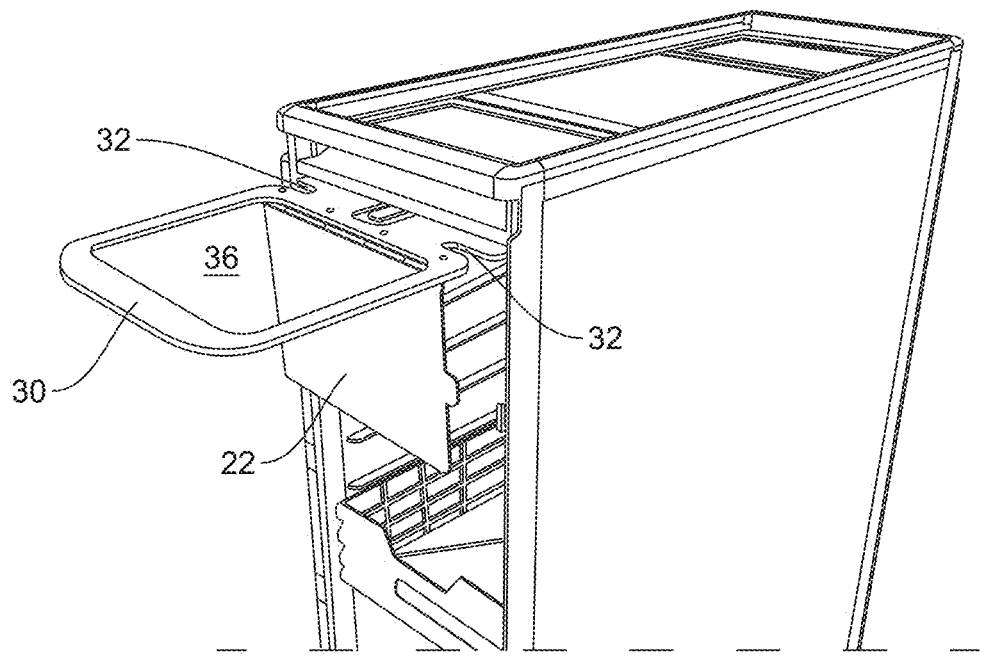
FIG. 4 is a side perspective view of FIG. 3, with the base hinged away from the outer rim of the sliding waste ring.
Figure 5:
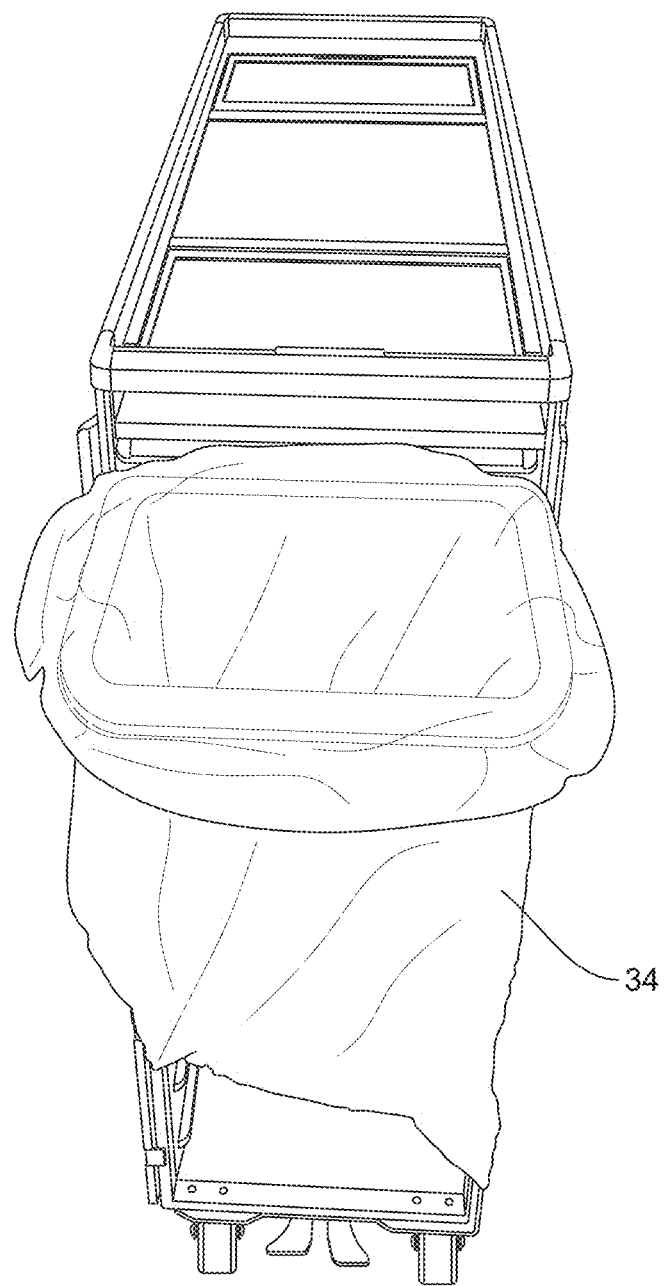
FIG. 5 shows a front perspective view of a plastic waste bag positioned within an opening of the sliding waste ring.

In order to complete this conversion, a sliding waste ring 28 is enabled. The sliding waste ring 28 is defined by an outer rim 30 and the dry ice compartment base 22. The rim 30 and base 22 are hingedly connected. Other connection options are possible, but it has been found that a hinged connection allows ease of use. However, it should be understood that a removable base or other moveable base is possible. As illustrated by FIG. 4, the base 22 is hinged down and away from the outer rim 30. The outer rim 30 defines side notches 32 that may be used to secure and support a plastic waste bag 34. As illustrated by FIG. 5, an attendant may insert the waste bag 34 into the opening 36 defined by the outer rim 30. Edges of the waste bag may be secured against side notches 32. It should be understood that optional clips or additional securement features may be provided in order to maintain the waste bag in the desired position.

Figure 18:
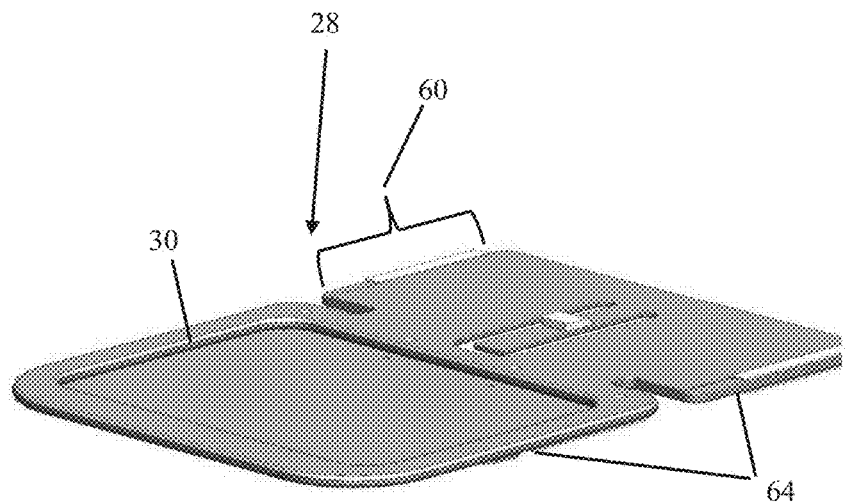
FIG. 18 shows a side perspective view of one example of a sliding waste ring, prior to being assembled with the trolley.
Figure 19:
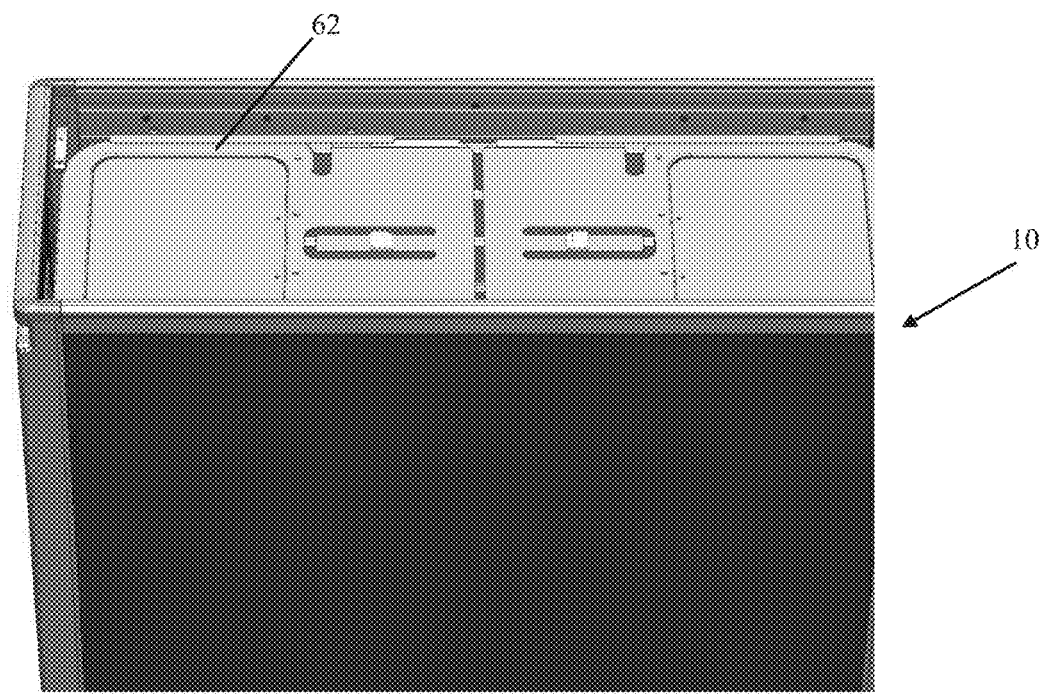
FIG. 19 shows a side perspective view of a trolley having two sliding waste rings assembled with respect thereto.
Figure 20:
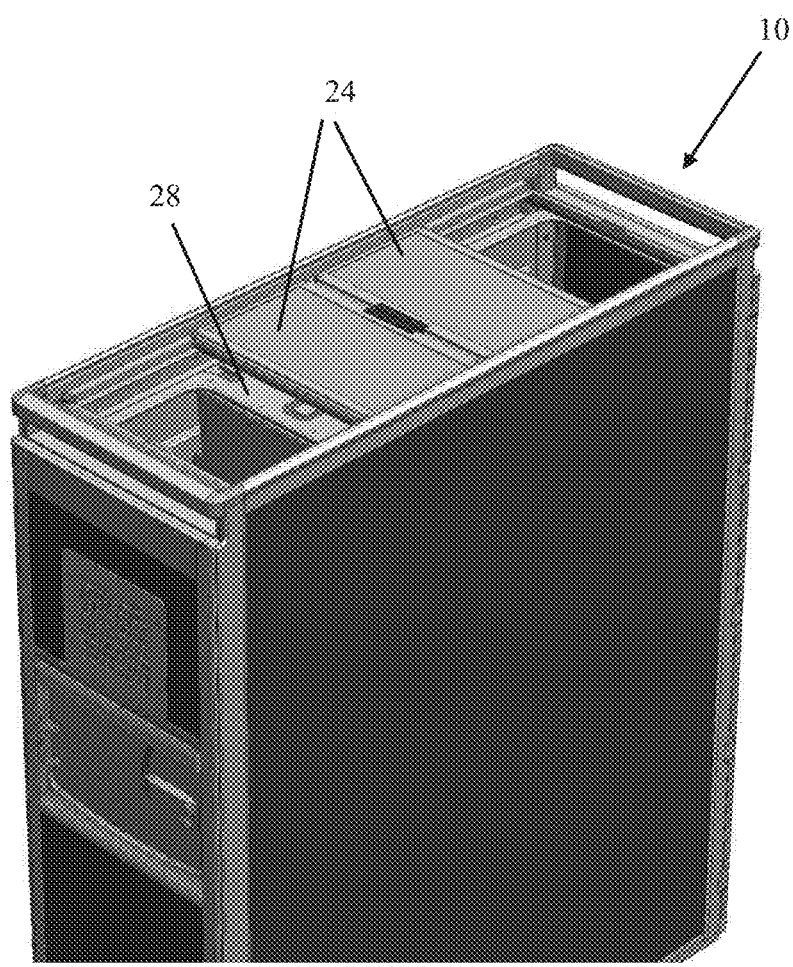
FIG. 20 shows a side perspective view of the trolley of FIG. 19 having waste flaps in position and the base of the slidable waste ring in an open configuration.

The sliding waste ring 28 may cooperate within internal grooves of the trolley interior 12. FIG. 18 illustrates a waste ring 28 prior to being positioned with respect to a trolley. Rearward of the outer rim 30 is a securement portion 60. As illustrated by FIG. 19, for a full-size trolley, it is possible to use two adjacent waste rings 28 in order to use the trolley for waste collection on both sides. (It should be understood that a half-size trolley may use only a single waste ring 28.) The waste rings 28 may be positioned in slidable engagement with respect to the trolley 10 via side grooves 62 on the trolley. In use, a side edge 64 of the waste ring 28 may be received by the trolley side grooves 62 for slidable movement as shown by FIG. 19. FIG. 20 illustrates the trolley of FIG. 19 with top flaps positioned over the waste rings.

Figure 21A:
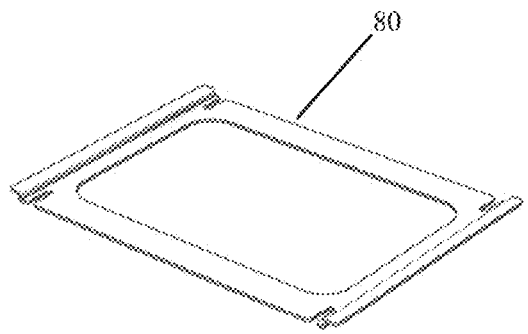
FIG. 21A shows a top plan view of an alternate embodiment of a waste ring.
Figure 21B:
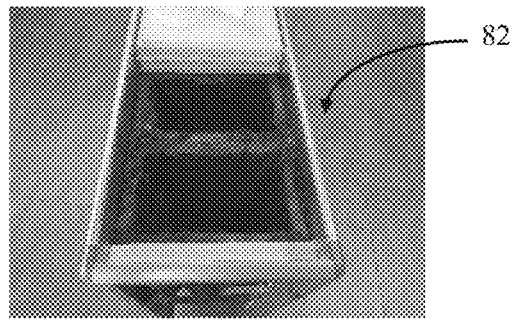
FIG. 21B shows two of the rings of FIG. 21A positioned in a trolley.
Figure 22A:
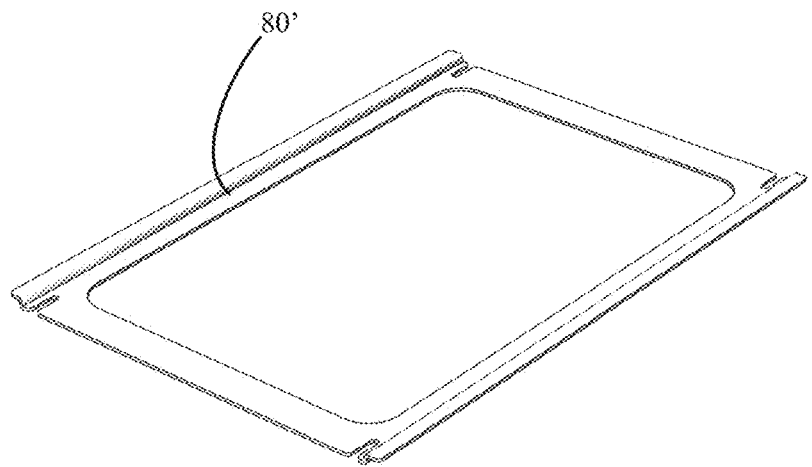
FIG. 22A shows a top plan view of an alternate embodiment of a waste ring.
Figure 22B:
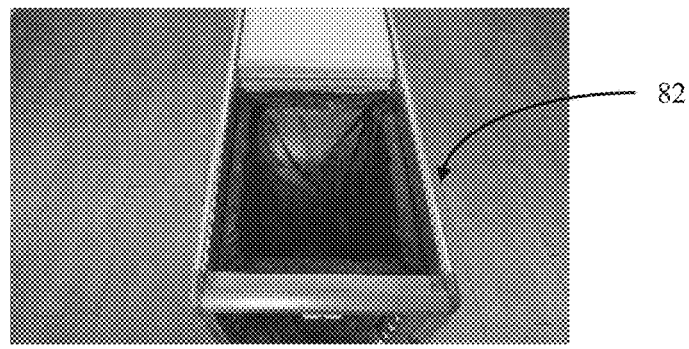
FIG. 22B shows the waste ring of FIG. 22B positioned in a trolley.

FIG. 21A shows a perspective view of an alternate waste ring 80. Waste ring may be a separate waste ring that can be positioned within the opening of the trolley. FIG. 21B shows two separate waste rings 80 of FIG. 21A positioned in a trolley opening 82. FIG. 22A shows a perspective view of an alternate waste ring 80' that is larger than the waste ring of FIG. 21A. Waste ring 80' may be a separate waste ring that can be positioned within the opening of the trolley. FIG. 22B shows the waste ring 80' of FIG. 22A positioned in trolley opening 82.

Figure 6:
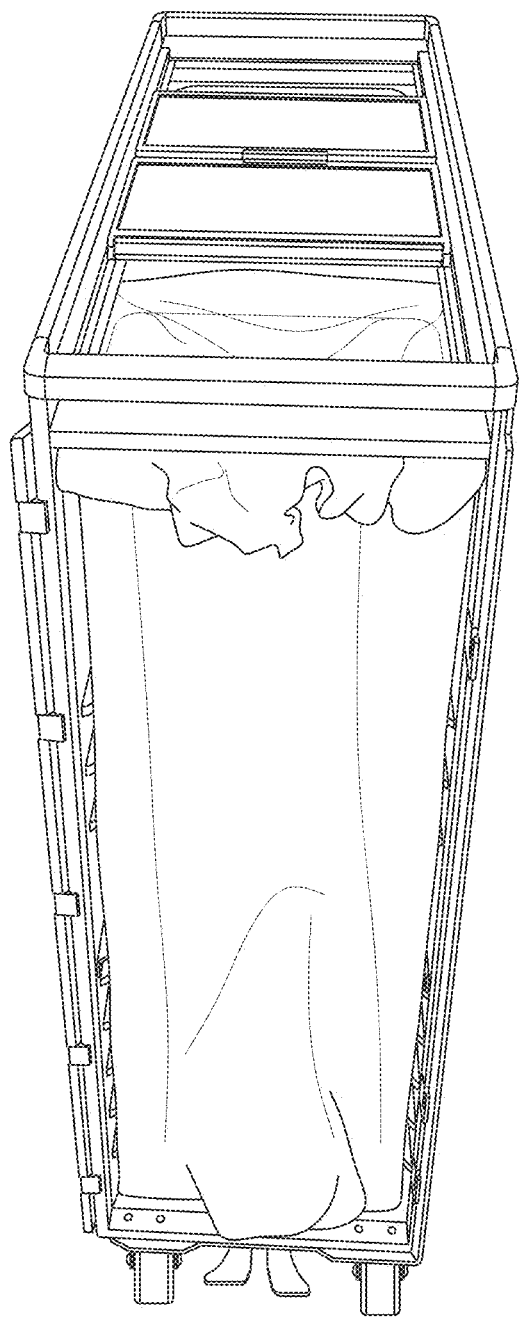
FIG. 6 shows a front perspective view of FIG. 5 with the sliding waste ring positioned back within the trolley interior, with double top flaps in an open configuration.
Figure 7:
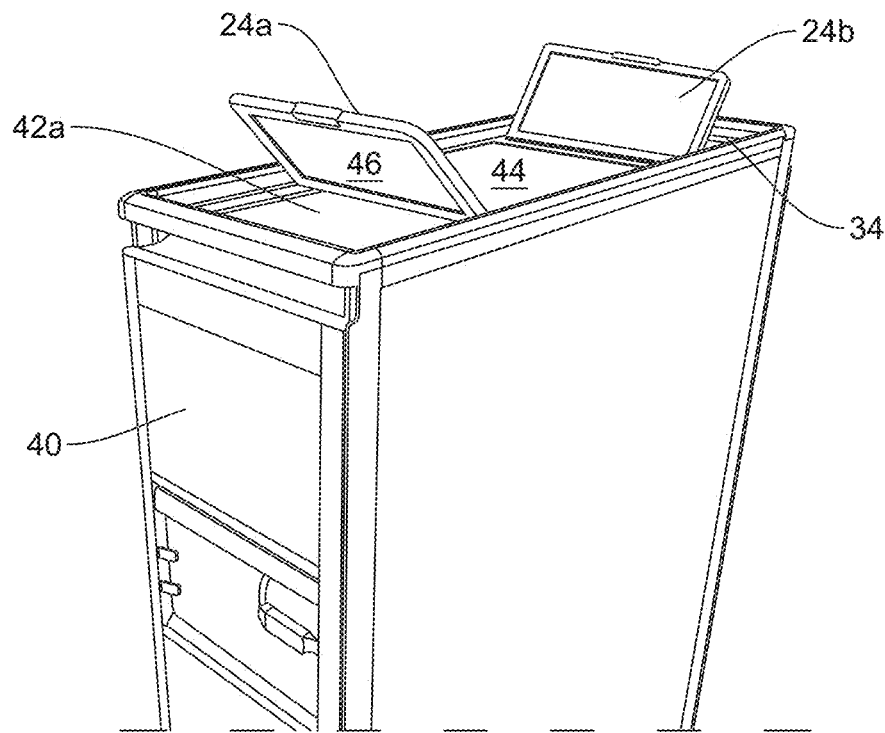
FIG. 7 shows a side perspective view of a trolley with the door closed and double top flaps in the process of being opened.

Once the waste bag 34 has been positioned within the opening 36 of the sliding waste ring 28, the sliding waste ring 28 is pushed back into the trolley body, as illustrated by FIG. 6. FIG. 7 illustrates a trolley version that has a double top flap 24a, 24b. The trolley door 40 is shown as closed, and a user is opening the double top flaps 24a, 24b in order to reveal access to the trolley interior which houses the waste bag 34. Opening of the top flaps 24a, 24b defines upper trash openings 42a, 42b. These upper trash openings 42a, 42b allow the user to insert trash directly into the top of the trolley, rather than into the side. Upper trash openings 42a, 42b also allow access to the interior of the trolley while the trolley door 40 is closed, providing an overall cleaner and more polished appearance to the trolley and trash collection process.

Figure 8:
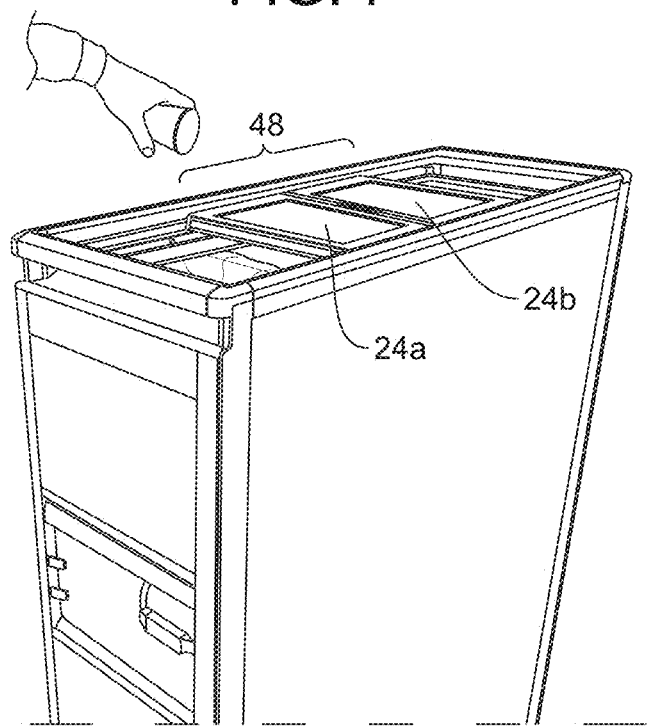
FIG. 8 shows a side perspective view of FIG. 7, with the top flaps fully opened to define a work surface and to reveal trash openings.

In FIGS. 8 and 20, both top flaps 24a, 24b have been opened and are resting along the trolley upper surface. FIG. 20 shows how the flaps may be positioned with respect to the slidable waste ring(s) 28 (without a waste bag in position). FIG. 8 shows the openable flaps in an open configuration (with a waste bag in place) so that a user may place trash within the trolley top portion.

A central portion 44 between the flaps defines a surface onto which the top flaps 24a, 24b may be folded back onto. Once folded back, the surface 46 that was originally the lower surface of flaps now defines an upper working surface 48. Upper working surface 48 may be used to collect or store various other items.

Figure 9:
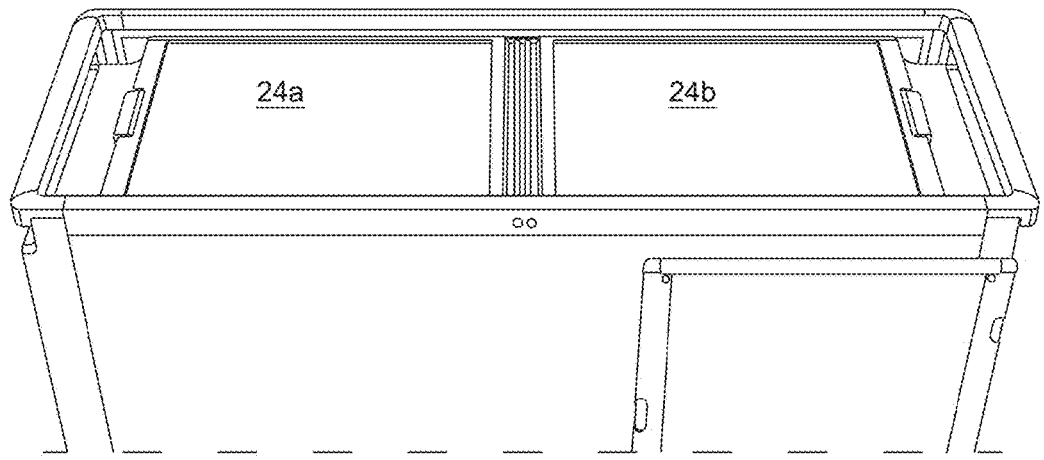
FIG. 9 shows a side perspective view of a trolley having top flaps separated via a hinge.
Figure 10:
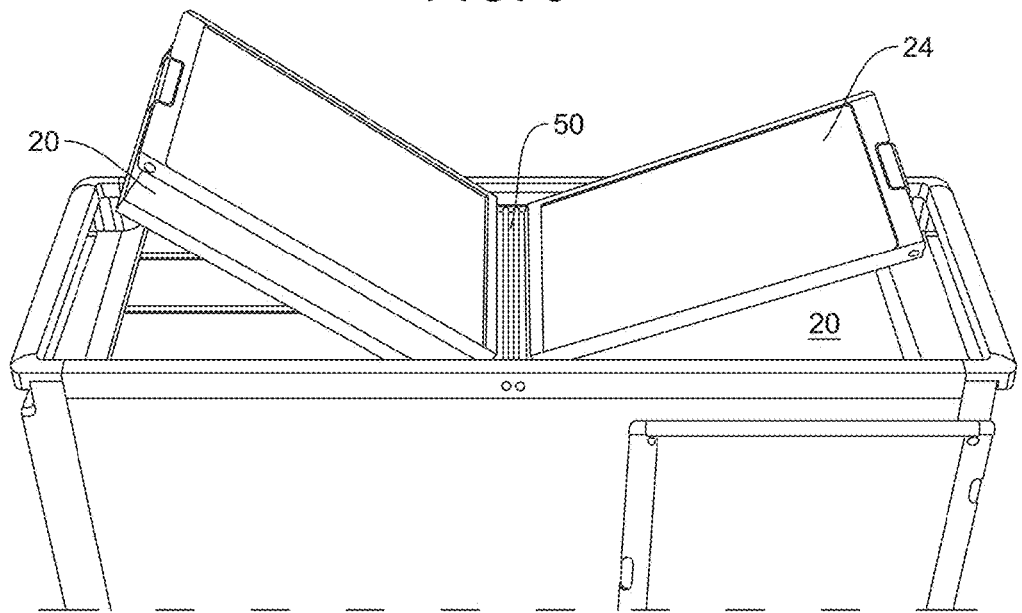
FIG. 10 shows a side perspective view of FIG. 9, illustrating independent movement of a top flap or a complete dry ice compartment.
Figure 11:
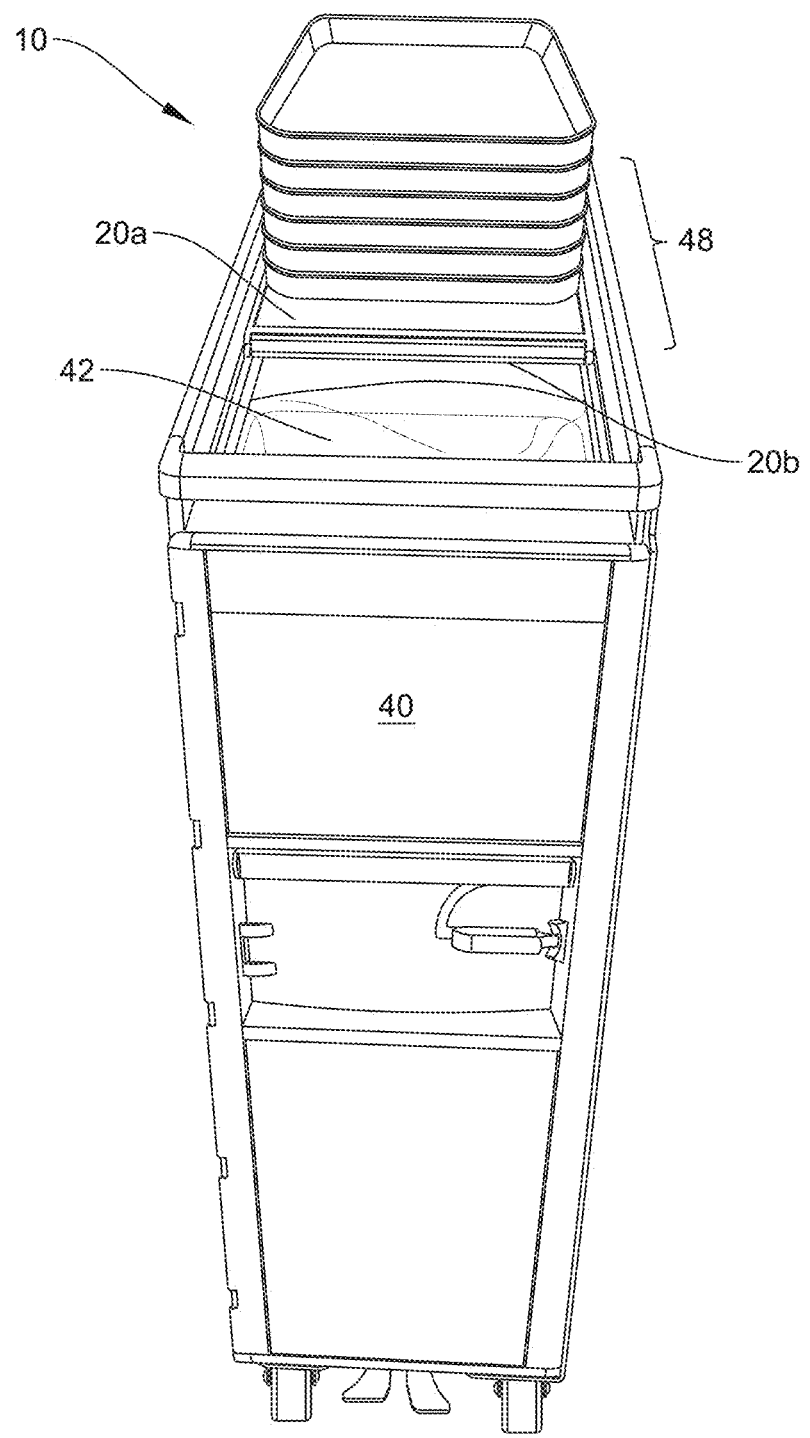
FIG. 11 shows a perspective view of a trolley in a waste collection configuration, with stacked trays on an upper surface.
Figure 23:
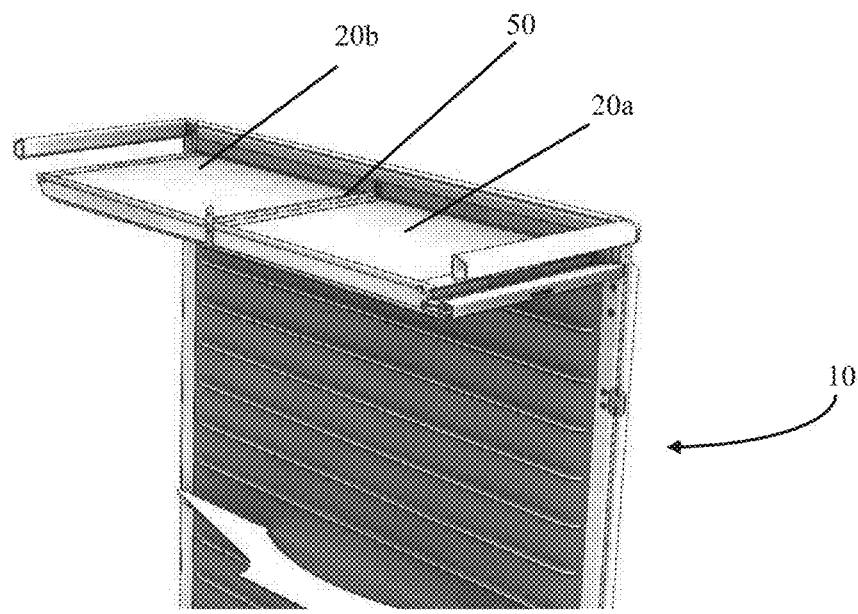
FIG. 23 shows a side perspective cut away view of the trolley of FIG. 9.
Figure 24:
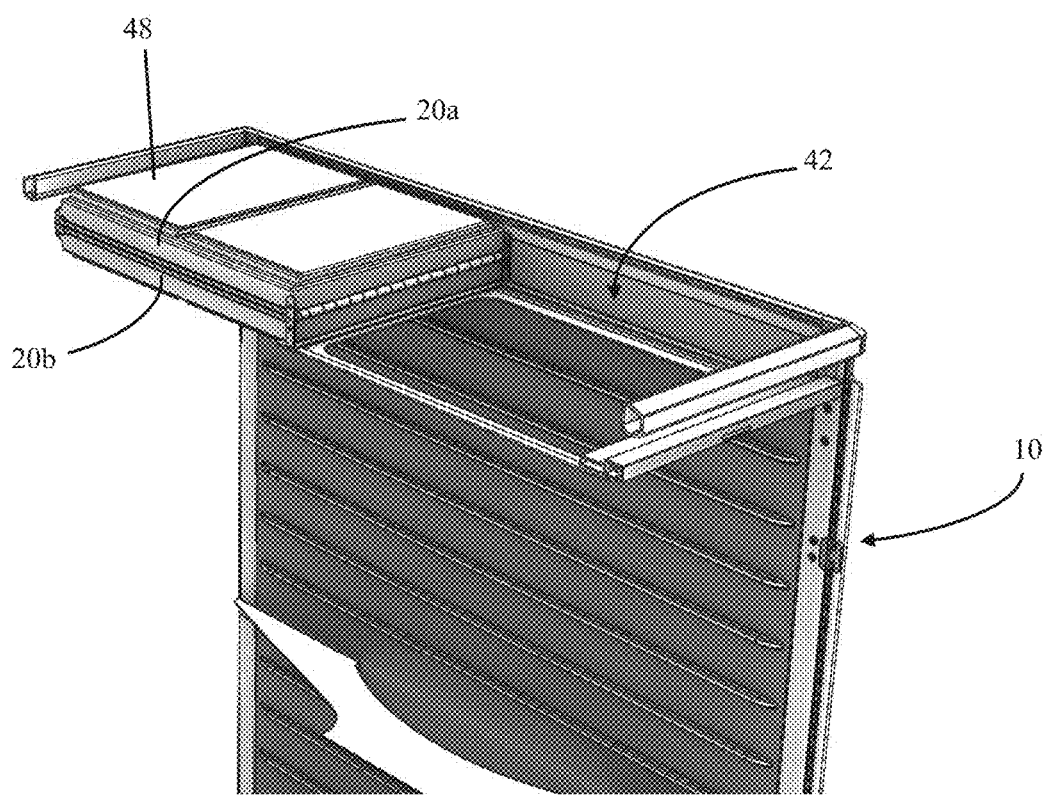
FIG. 24 shows a side perspective cut away view of the trolley of FIG. 11.

FIG. 9 shows a trolley embodiment that does not have a central portion 44, but instead, has double top flaps 24a, 24b that abut one another directly. As illustrated by FIG. 10, each top flap defines an upper portion of a dry ice compartment 20. Each dry ice compartment 20 has a top flap 24 that may be independently opened, as illustrated by the right side of FIG. 10. Additionally, each dry ice compartment 20 may be hinged open as a whole compartment, as shown by the hinged compartment 20 on the left side of FIG. 10. FIG. 23 illustrates a side cut away view of the trolley of FIG. 9. Both dry ice compartments 20a, 20b are shown as closed. A central hinge 50 allows one of the dry ice compartments 20a to be rotated up and placed over a second dry ice compartment 20b, as illustrated by FIGS. 11 and 24. This provides a single trash opening 42 in the upper portion of the trolley 10. Any of the sliding waste ring as described above may be used in this embodiment in order to support a waste bag positioned in the trolley interior. Alternatively, a separate waste ring may be used. The stacked dry ice compartments 20a, 20b may define a working surface 48 as shown in FIG. 24. FIG. 11 illustrates the working surface 48 being used to support meal trays.

Figure 12:
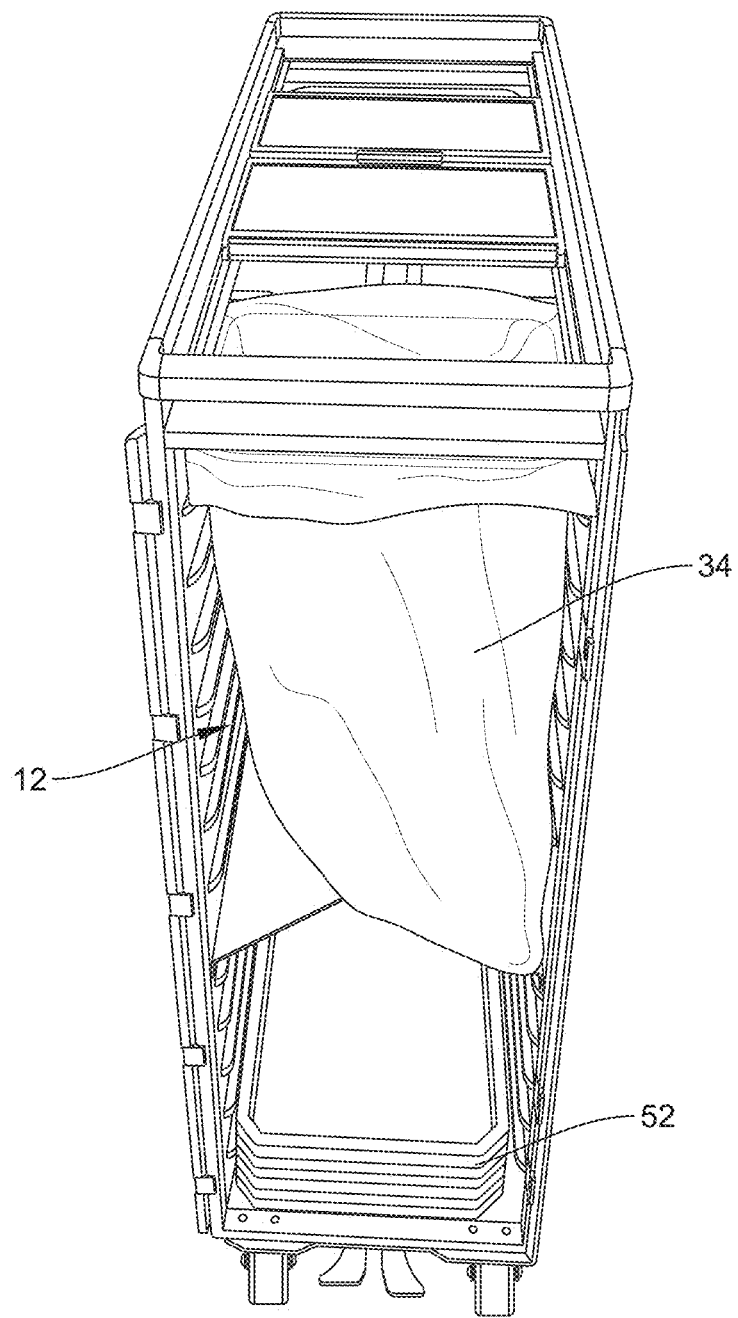
FIG. 12 shows a front perspective view of a trolley and a waste collection configuration, with trays stacked in a lower portion of the trolley interior.

FIG. 12 shows that even with a waste bag 34 positioned within the trolley interior 12, it is possible to stack trays 52 or bins below the trash bag 34.

Figure 13:
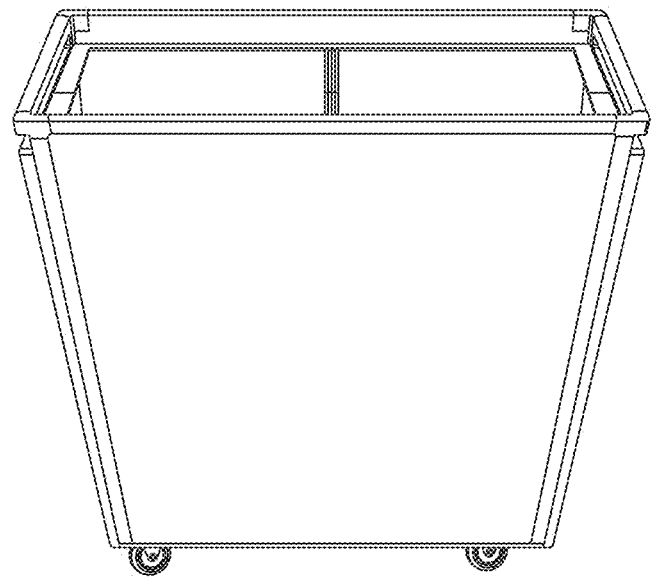
FIG. 13 shows a side perspective view of a trolley with dry ice compartment completely removed.

FIG. 13 illustrates that both dry ice compartments 20a, 20b may be completely removed if it is desirable to provide a trolley with a completely open top. This open top version is also applicable to a deep top trolley configuration.

Figure 14:
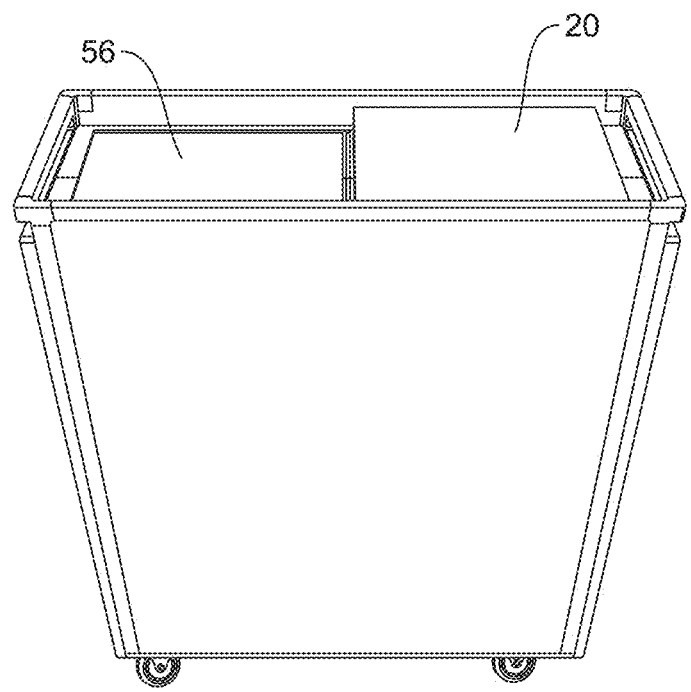
FIG. 14 shows a side perspective view of a trolley with a single dry ice compartment or with stacked/folded dry ice compartments, revealing an open space.
Figure 15:
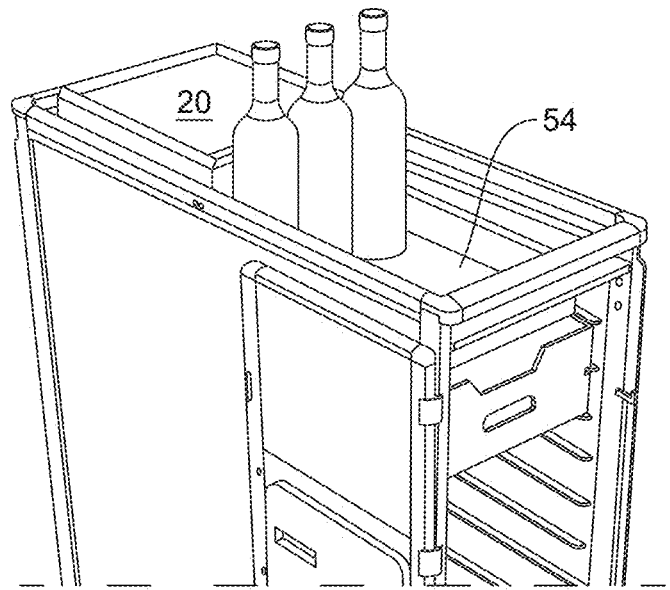
FIG. 15 shows a side perspective view of a trolley having a bin or drawer positioned within the open space. In this image, the trolley door is open.
Figure 16:
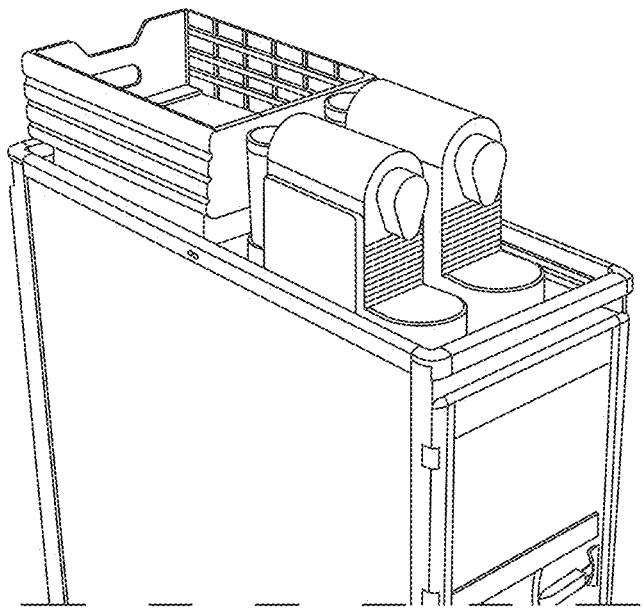
FIG. 16 shows a side perspective view of a bin stacked above one or more dry ice compartments, and use of the open space for beverage machines. In this image, the trolley door is closed.

FIG. 14 illustrates a trolley embodiment that has a deep top with a dry ice compartment 20. In this example, the open top portion 56 may be used for other applications, as shown by FIGS. 15 and 16. For example, in FIG. 15, a single rear dry ice compartment 20 (or a second dry ice compartment 20b rotated back and over a first dry ice compartment 20a) is provided, and a deep drawer or bin 54 is positioned in the available open space 56 (shown by FIG. 14). This creates a deep top panel that can allow an ergonomic workspace for flight attendants, defining a space for larger bottles or packages to be positioned. FIG. 16 illustrates an alternate embodiment in which appliances such as a coffee machine or a beer tap or a meal dispenser may be positioned.

Figure 17A:
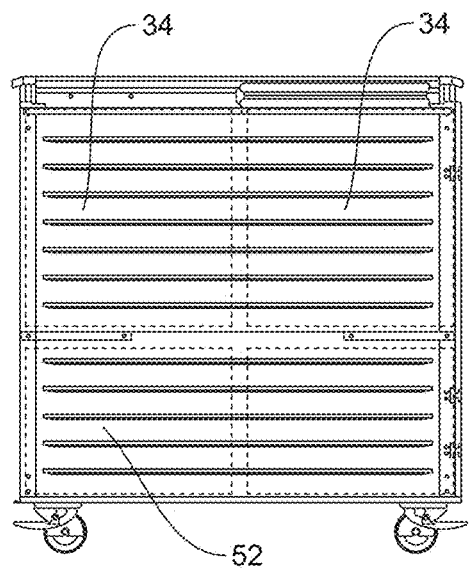
FIG. 17A shows a side schematic view of a trolley and a waste collection configuration housing an upper waste bag and a lower tray storage portion in each half of the trolley.
Figure 17B:
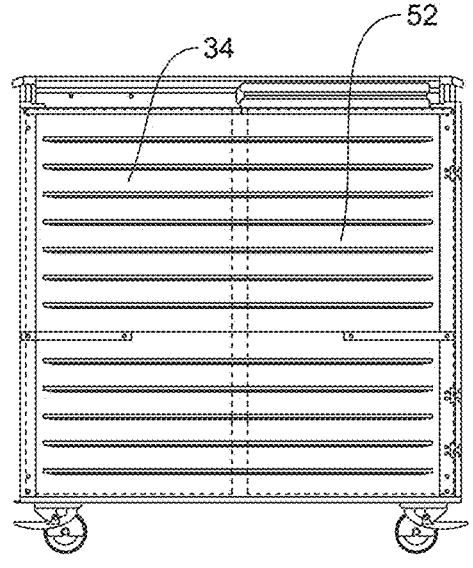
FIG. 17B shows a side schematic view of a trolley and a waste collection configuration housing a waste bag and one half of the trolley and tray storage in the other half trolley.
Figure 17C:
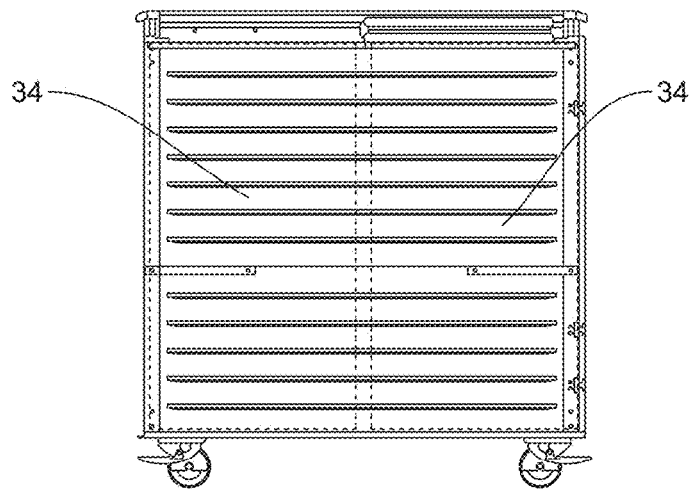
FIG. 17C shows a side schematic view of a trolley and a waste collection configuration housing waste bags in both halves of the trolley.
Figures 25, 26:
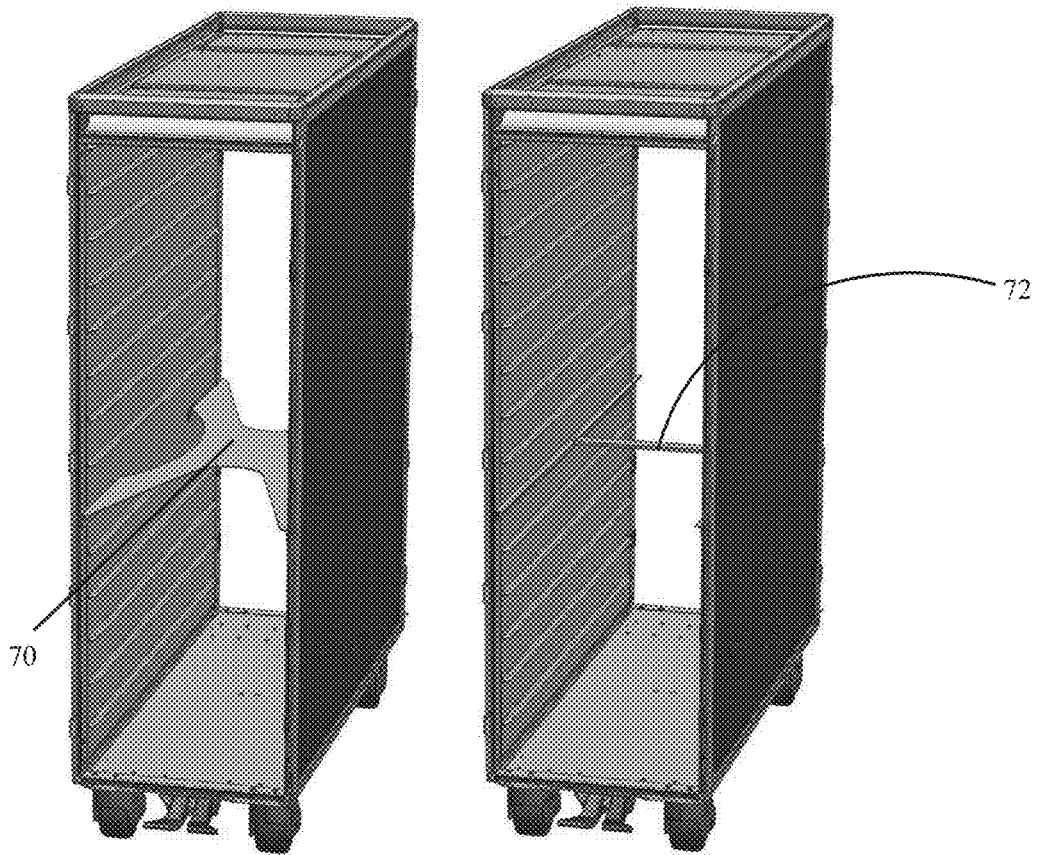
FIG. 25 shows a front perspective view of a trolley having an X-shaped divider.
FIG. 26 shows a front perspective view of a trolley having an H-shaped bar divider.
Figure 27:
FIG. 27 shows a prior art meal trolley into which a Flex-e-bag is positioned.
Figure 28:
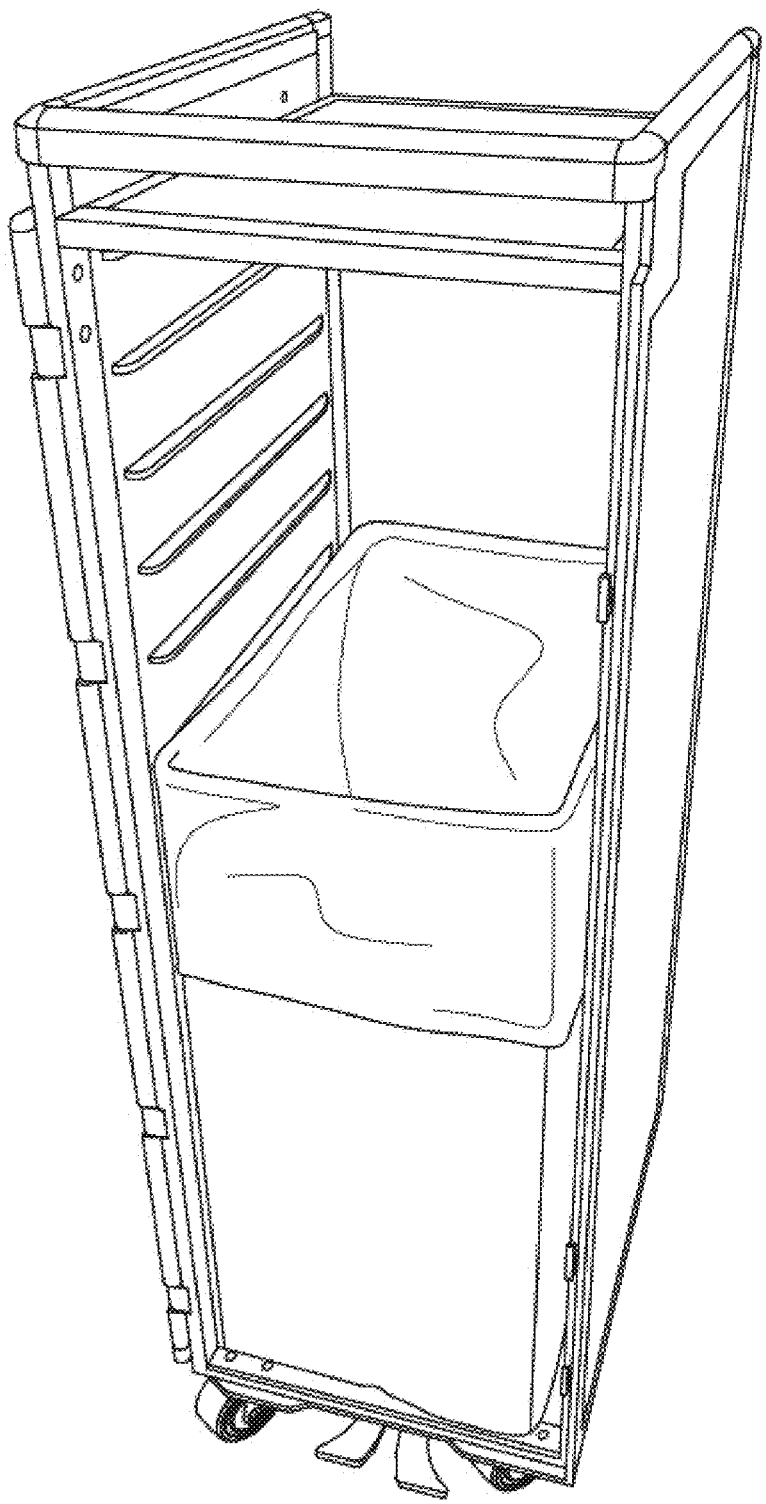
FIG. 28 shows a prior art meal trolley into which a cardboard waste collection bin is positioned.

FIG. 17 illustrates various options of space usages for the convertible trolleys 10 described herein. In FIG. 17A, two upper trolleys halves are used for waste collection and the two lower trolley halves are used for tray storage. In FIG. 17B, one trolley half is used for waste storage and a second trolley half is used for tray storage. In FIG. 17C, two complete trolley halves are both used for waste storage. It should be understood that these examples are shown for illustration only and other options are possible and considered within the scope of this disclosure. As shown by FIGS. 25 and 26, various types of dividers may be used in order to help convert the trolley for various uses. For example, a X-shaped divider 70 may be used when the upper trolley is to be used differently than the lower half of the trolley. Alternatively, it is possible to use an H-shaped divider 72.

It is possible to provide various additional accessories that assist with the meal service/trash collection processes. For example, it is possible to provide a cup stacking/collecting tube associated with the trolley, a liquid collector or separator, a recycling system, a tilting waste bin, or any combination thereof.

While certain embodiments have been shown and described, it should be understood that changes and modifications, additions and deletions may be made to the structures and methods recited above and shown in the drawings without departing from the scope or spirit of the disclosure or the following claims.

What is claimed is:

1. A trolley configured to be convertible between meal/beverage service and waste collection service, the trolley comprising:
    at least one dry ice compartment defined by a top flap and a dry ice compartment base,
    a sliding waste ring defined by an outer rim and the dry ice compartment base, the outer rim and the dry ice compartment base being hingedly cooperable such that when the sliding waste ring is extended from the trolley and the dry ice compartment base is hinged away from the outer rim, an opening is defined by the outer rim configured to support a waste bag, wherein when the top flap is opened, a trash opening is defined in an upper portion of the trolley.

2. The trolley of claim 1, wherein the waste ring is configured to maintain its securement within the trolley.

3. The trolley of claim 1, wherein the waste ring comprises side notches for securement of the waste bag.

4. The trolley of claim 1, wherein the trolley comprises a trolley interior comprising internal ledges for supporting meal trays or bins or both.

5. The trolley of claim 1, wherein the trolley comprises first and second dry ice compartments in hinged cooperation with one another.

6. The trolley of claim 5, wherein the first dry ice compartment may be hinged open and rest along a top portion of the second dry ice compartment.

7. The trolley of claim 1, wherein the trolley comprises first and second dry ice compartments with a central portion therebetween, such that a first top flap of the first dry ice compartment and a second top flap of the second dry ice compartment are independently openable, and when in an open configuration, the top flaps lie against the central portion.

8. The trolley of claim 1, wherein the at least one dry ice compartment is removable from the trolley.

9. The trolley of claim 1, further comprising one or more bins that may be positioned within an open space defined by a removed or hinged dry ice compartment.

10. A method for converting a meal/beverage trolley to a waste collection trolley, comprising:
    providing the trolley of claim 1,
    extending the sliding waste ring out from the trolley,
    hinging the dry ice compartment base away from the outer rim of the sliding waste ring,
    positioning a waste bag within the opening of the sliding waste ring,
    sliding the waste ring back into the trolley,
    opening the top flap to define a trash opening at an upper portion of the trolley.

* * * * *